US008253863B2

(12) United States Patent
Ashizaki et al.

(10) Patent No.: US 8,253,863 B2
(45) Date of Patent: Aug. 28, 2012

(54) DISPLAY UNIT FOR TRANSMITTING/RECEIVING ANALOG VIDEO TRANSMITTED VIA A LONG-DISTANCE TRANSMISSION LINE

(75) Inventors: Yoshihiro Ashizaki, Tokyo (JP); Hideki Tanizoe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 298 days.

(21) Appl. No.: 12/652,763

(22) Filed: Jan. 6, 2010

(65) Prior Publication Data

US 2010/0201884 A1     Aug. 12, 2010

(30) Foreign Application Priority Data

Feb. 12, 2009   (JP) ................. 2009-029558

(51) Int. Cl.
*H04N 5/38* (2006.01)
(52) U.S. Cl. .................................. 348/723
(58) Field of Classification Search .......... 348/607, 348/611, 618, 552, 553, 723, 725; 725/12, 725/148, 149
See application file for complete search history.

(56) References Cited

U.S. PATENT DOCUMENTS

| | | | | |
|---|---|---|---|---|
| 4,859,934 A * | 8/1989 | Gale et al. ............... | 324/76.56 |
| 4,860,045 A * | 8/1989 | Hamada et al. .......... | 396/95 |
| 5,068,621 A * | 11/1991 | Hayward et al. .......... | 330/253 |
| 6,014,544 A * | 1/2000 | Shinozaki et al. ........ | 725/12 |
| 6,184,919 B1 * | 2/2001 | Asprey et al. ............ | 725/148 |
| 6,697,603 B1 * | 2/2004 | Lovinggood et al. ..... | 455/13.1 |
| 7,221,389 B2 | 5/2007 | Ahern et al. | |
| 7,933,421 B2 * | 4/2011 | Asada ...................... | 381/86 |
| 2006/0001777 A1 * | 1/2006 | Araki ...................... | 348/706 |
| 2006/0119594 A1 | 6/2006 | Ahern et al. | |
| 2007/0300284 A1 * | 12/2007 | Hall et al. ................. | 725/149 |
| 2008/0186407 A1 | 8/2008 | Miller et al. | |
| 2009/0201421 A1 * | 8/2009 | Mawatari et al. ......... | 348/553 |

FOREIGN PATENT DOCUMENTS

| | | |
|---|---|---|
| CN | 20041000819.6 | 12/2004 |
| CN | 200410042720.0 | 2/2005 |
| JP | 2006-304219 A | 11/2006 |

* cited by examiner

*Primary Examiner* — Paulos Natnael
(74) *Attorney, Agent, or Firm* — Birch, Stewart, Kolasch & Birch, LLP

(57) ABSTRACT

A receiver receives differential analog video signals from a long distance transmission line and converts them into unbalanced analog video signals to output to an analog video signal line that is internal wiring. A frequency response characteristics corrector inside the receiver corrects the frequency response characteristics attenuated mainly by the long distance transmission line, and a delay corrector corrects differences of propagation delay. A transmitter receives the unbalanced analog video signals form the analog video signal line and converts them into balanced differential analog video signals to transmit to a long distance transmission line as differential analog video signals. A video output circuit outputs the unbalanced analog video signals or unbalanced digital video signals to a video signal line as unbalanced video signals.

6 Claims, 4 Drawing Sheets

DISPLAY UNIT FOR TRANSMITTING/RECEIVING ANALOG VIDEO TRANSMITTED VIA A LONG-DISTANCE TRANSMISSION LINE

BACKGROUND OF THE INVENTION

1. Field of the Invention

The present invention relates to a display unit in a remote display system performing a long distance transmission of an analog video signal.

2. Description of the Background Art

In a display system where a video sending device and a display unit are displaced at relatively distant places from each other, when an analog video signal is transmitted over long distances without high-frequency modulation, it is transmitted as a differential analog video signal, using a balanced line for a long distance transmission line in order to enhance resistance to disturbance noise.

The differential analog video signal can be transmitted with a much wider band when transmitted as baseband signals rather when than being subjected to high-frequency modulation. However, there is influence of frequency response characteristics of the aforementioned long distance transmission line and a transmission drive circuit, so that it is necessary to adjust on the basis of correction parameters using a correction circuit of the frequency response characteristics. Further, differences of propagation delay of a line transmitting a plurality of signals such as the red, green, and blue signals cannot be ignored, so that it is necessary to adjust on the basis of the correction parameters using a correction circuit of the aforementioned propagation delay.

If the image quality is such that propagation delay for each frequency and distortion for each linear characteristics level of a drive circuit cannot be ignored, it is necessary to form and add a correction circuit for each strictly, but causing a circuit to be expensive. Therefore, in the present specification, a technology will be described as applied to a display unit at a level to be allowable by absorbing the deterioration of the image quality with adjustment of the aforementioned propagation delay correction.

Conventionally, as an example of disposing a plurality of display units in a display system, video signals are distributed to each of the plurality of display units by providing a diverging device of long distance video signals outside of each of the display units, as an intercom system disclosed in Japanese Patent Application Laid-Open No. 2006-304219 (paragraphs [0018] to [0056], and FIG. 1).

Further, for example, U.S. Patent Application Publication Nos. 2006/0119594 (paragraphs [0002] to [0106], and FIG. 1), and 2008/0186407 (paragraphs [0016] to [0056], and FIGS. 4 to 6) disclose a configuration of distributing video signals with a long distance video transmission line and disposing a receiving device outside the display unit.

The conventional display unit disclosed in the documents such as Japanese Patent Application Laid-Open No, 2006-304219 in the above is generally configured to provide a receiver (receiving device) outside the display unit, as described above. This has caused the following problems (1) to (3).

(1) In accordance with a device layout, a long cable for connecting an external receiver and a display unit, a strong amplifier, and an external electromagnetic noise countermeasure circuit are needed for each of power source, a video signal, and a control signal.

(2) In system installation sites, operation cost is produced accompanying a wiring operation of cables including an operation of screwing cables such as a VGA cable, a RS-232C cable, and the like.

(3) In setting parameters in a receiver, when a result obtained by automatically adjusting with the receiver itself is fine adjusted manually, an adjusting switch of the receiver itself is to be used. Also, when it is adjusted and controlled from both sides of a host computer and a remote controller of the display unit, a switching device for an adjustment and control host is needed to be provided in the receiver itself.

Furthermore, the conventional display unit disclosed in the documents such as U.S. Patent Application Publication Nos. 2006/0119594 and 2008/0186407 has a configuration of providing a distributor so as to be independent from the receiver outside the display unit. This needs an external wiring as a plurality of long distance transmission signal lines, and causes a problem that operation cost is produced accompanying a wiring operation of cables.

SUMMARY OF THE INVENTION

It is an object of the present invention to provide a display unit suppressing wiring members and operation cost, facilitating operation, and having appropriate performance, when used in a display system.

A first aspect of the present invention is intended for a display unit used for a display system transmitting differential analog video signals sent from predetermined video sending sources via a first long distance transmission line. According to the present invention, the display unit includes a receiver, video display processing circuit, controller, and transmitter.

The receiver converts the differential analog video signals along the first long distance transmission line into unbalanced analog video signals. The receiver includes a frequency response characteristics corrector, and delay corrector. The frequency response characteristics corrector corrects frequency gain characteristics attenuated in the first long distance transmission line on the basis of a first correction parameter. The delay corrector corrects propagation delay on the first long distance transmission line on the basis of a second parameter.

The video display processing circuit displays an image on a predetermined display device on the basis of the unbalanced analog video signals.

The controller provides the frequency response characteristics corrector and delay corrector inside the receiver with the first and second parameters.

The transmitter converts the unbalanced analog video signals into a differential form and transmits output differential analog video signals to a second long distance transmission line to which external devices are connectable.

The display unit according to the first aspect of the present invention includes the receiver receiving the differential analog video signals from the first long distance transmission line, and the transmitter transmitting the output differential analog video signals from the second long distance transmission line. This allows connection to other display units to be made only with the second long distance transmission line.

This also suppresses wiring materials and operation cost of the display system including the display unit according to the first aspect of the invention. Further, the receiver includes the frequency response characteristics corrector and delay corrector, allowing the display unit to exercise appropriate performances.

In addition, the first and second correction parameters are set under the control of the internal controller. This facilitates the control of the correction of the frequency response characteristics corrector and delay corrector inside the receiver.

A second aspect of the present invention is intended for a display unit used for a display system transmitting differential analog video signals sent from predetermined video sending sources via a first long distance transmission line. According to the present invention, the display unit includes a receiver, video display processing circuit, controller, and distributor.

The receiver converts the differential analog video signals along the first long distance transmission line into unbalanced analog video signals. The receiver includes a frequency response characteristics corrector, and delay corrector. The frequency response characteristics corrector corrects frequency gain characteristics attenuated in the first long distance transmission line on the basis of a first correction parameter. The delay corrector corrects propagation delay on the first long distance transmission line on the basis of a second parameter.

The video display processing circuit displays an image on a predetermined display device on the basis of the unbalanced analog video signals.

The controller provides the frequency response characteristics corrector and delay corrector inside the receiver with the first and second parameters.

The distributor performs a predetermined correcting process on the differential analog video signals and distributes to the second long distance transmission line as output differential analog video signals. The distributor includes a distributor frequency response characteristics corrector, and a distributor delay corrector. The distributor frequency response characteristics corrector corrects frequency gain characteristics attenuated in the first long distance transmission line on the basis of a third correction parameter. The distributor delay corrector corrects propagation delay on the first long distance transmission line on the basis of a fourth parameter. The predetermined correcting process includes correcting processes by the distributor frequency response characteristics corrector and the distributor delay corrector.

The display unit according to the second aspect of the present invention includes the receiver receiving the differential analog video signals from the first long distance transmission line, and the distributor distributing the output differential analog video signals from the second long distance transmission line inside thereof. This allows connection to other display units to be made only with the second long distance transmission line.

This also suppresses wiring materials and operation cost of the display system including the display unit according to the second aspect of the invention. Further, the receiver includes the frequency response characteristics corrector and delay corrector, allowing the display unit to exercise appropriate performances.

In addition, the third and fourth correction parameters are set under the control of the controller inside the display unit. This facilitates the control of the correction of the distributor frequency response characteristics corrector and the distributor delay corrector.

These and other objects, features, aspects and advantages of the present invention will become more apparent from the following detailed description of the present invention when taken in conjunction with the accompanying drawings.

DESCRIPTION OF THE PREFERRED EMBODIMENTS (Underlying Technology)

Here, an example of a conventional common display system will be illustrated in order to facilitate understanding of features of the display unit according to the present invention.

Figure 4:
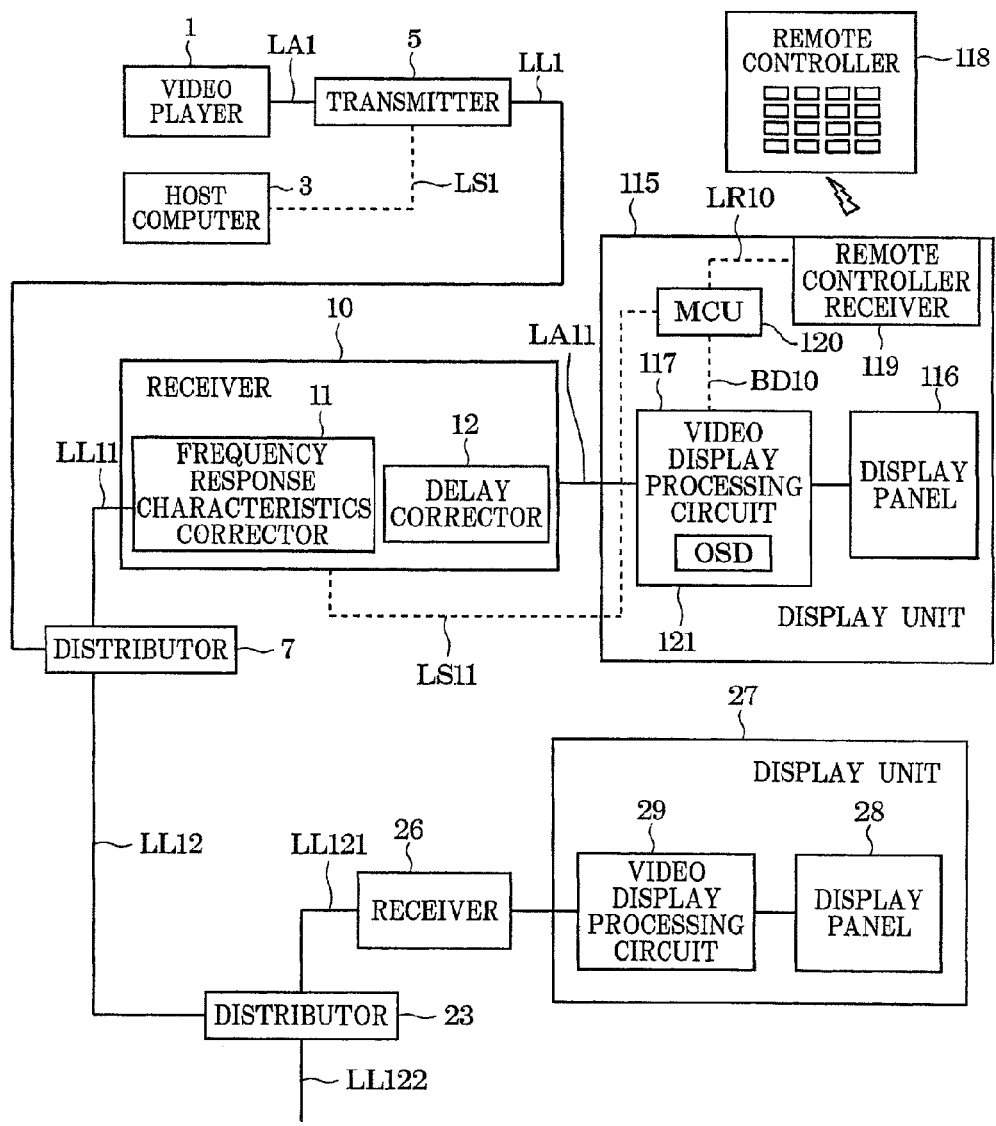
FIG. 4 is an illustrative diagram of a configuration of a common display system using a long distance transmission line of differential analog video signals.

FIG. 4 is an illustrative diagram showing a configuration of a common display system using a long distance transmission line of a differential analog signal.

As shown in FIG. 4, a video player 1 functions as a video source. An analog video signal that is a baseband signal (i.e. unmodulated) of RGB three primary colors outputted from the video player 1 is transmitted to a transmitter 5 via an analog video signal line LA1.

A host computer 3 functions as a system control device for operating the entire display system using the long distance transmission line, and exchanges a control signal and response signal via a system control signal line LS1.

The transmitter 5 inputs an unbalanced signal from four signal lines consisting of three RGB signal lines corresponding to the analog video signal line LA1, and one control line corresponding to the system control signal line LS1, converts this signal into a balanced differential signal, and outputs it to a long distance transmission line LL1 as a differential analog video signal. At this time, the transmitter 5 outputs the differential analog video signal with power capable of driving even a long distance transmission line. The long distance transmission line LL1 consists of four-pair twisted pair cable represented by CAT-5.

A distributor 7 diverges the differential analog video signal along the long distance transmission line LL1, and distributes it to a long distance transmission lines LL11 and LL12.

A receiver 10 receives the differential analog video signal distributed from the long distance transmission line LL11 and converts it into an unbalanced analog video signal. The receiver 10 includes a frequency response characteristics corrector 11 and a delay corrector 12 inside thereof. The frequency response characteristics corrector 11 corrects frequency response characteristics attenuated mainly by the long distance transmission line LL1. The delay corrector 12 adjusts differences of propagation delay. It is generally considered that the propagation delay is caused because the four-pair twisted pair cable composing the long distance transmission line LL1 has different lengths and capacities for each cable since it is industrially manufactured.

The unbalanced analog video signal form the receiver 10 is taken into a display unit 115 via an analog video signal line LA11. The display unit 115 is composed of a display panel 116, a video display processing circuit 117, a remote controller receiver 119, and an MCU (Micro Controller Unit) 120.

The MCU 120 is connected to the receiver 10 via a system control signal line LS11, and connected to the video display processing circuit 117 via a display control bus BD10, and further connected to the remote controller receiver 119 via a remote controller control line LR10. The remote controller receiver 119 receives a signal from a remote controller 118, and the signal received from the remote controller is transmitted to the MCU 120 via the remote controller control line LR10. The MCU 120 functions as a main control device for controlling each component (the video display processing circuit 117 and the like) of the display unit 115. The display control bus BD10 is composed of a display control signal line in I2C form and the like.

The display panel 116 is a display panel represented by a two-dimensional liquid crystal optical valve type display device including a light. The video display processing circuit 117 performs a scale conversion process represented by resizing and slew rate on an unbalanced analog video signal obtained via the analog video signal line LA11 so as to adapt to the number of pixels and a scanning method of the display panel 16. At this time, a setting situation rendering means (OSD (On Screen Display)) 121 inside the video display processing circuit 117 obtains the content set and rendered by an MCU 19 on the basis of the content operated by the remote controller 118 (remote controller receiving signal) via the display control bus BD10, and superimposes this rendered content on an image defined by the unbalanced analog video signal. The video display processing circuit 117 is generally referred to as a scalar.

The long distance transmission line LL12 is connected to a distributor 23, and further distributed to a long distance transmission lines LL121 and LL122 by the distributor 23. A receiver 26 is connected to a receiver connected to the long distance transmission line LL121. A display unit 27 is connected to the receiver 26, and includes a display panel 28 and a video display processing circuit 29 inside thereof.

Here, an example of technology generally used for a video signal line is given. For instance, a VGA cable is generally used for the analog video signal line LA11 connecting the receiver 10 and the display unit 115, and a connector of mini D-sub 15 pin is provided with the cable. In the case of the VGA cable, it is possible to extend a length of cable to 15 m if a long cable correction circuit is used. In contrast, in the case of an internal wiring within several tens cm inside the display unit 115, an expensive coaxial cable can be short, obtaining it at low-cost with relatively simple connector and circuit.

Next, an example of technology generally used for a control channel is given. For instance, an RS-232C communication is generally used for the system control signal line LS11 connecting the receiver 10 and the display unit 115, and a connector of mini D-sub 9 pin is provided with the cable. In the case of the RS-232C, it is possible to transmit at 115.2 kbps with a cable length of a relatively short distance to be within 15 m. In the case of RS-422, it is possible to transmit at 10 Mbps with a distance as long as 1.5 km. When RS-485 for a long distance similarly to RS-422 is used, a bus connection of several devices is possible. Further longer distance is made possible by an optical cable, but a circuit is expensive. On the other hand, in the case of the internal wiring within several tens cm inside the display unit, a simple parallel port, or serial communication such as I2C can be used, obtaining it at low-cost with relatively simple wiring and circuit. It should be noted that whether the remote controller 118 is wired or wireless is not a problem.

<First Preferred Embodiment>

Figure 1:
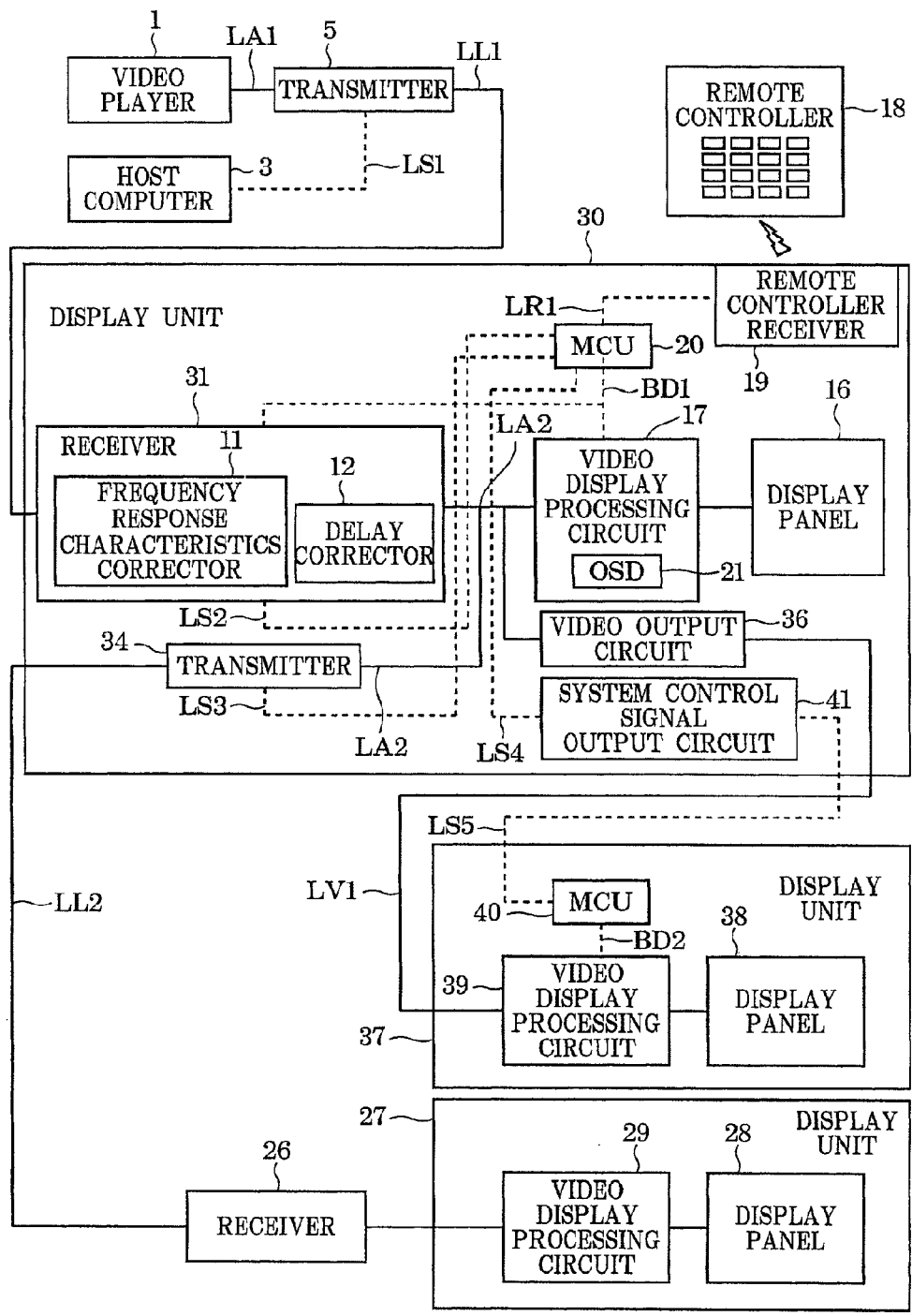
FIG. 1 is an illustrative diagram of a configuration of a display system including a display unit according to a first preferred embodiment of the present invention and using a long distance transmission line of differential analog video signals.

FIG. 1 is an illustrative diagram of a configuration of a display system including a display unit according to a first preferred embodiment of the present invention and using a long distance transmission line of differential analog video signals. The components denoted by the same reference numbers as those in FIG. 4 are basically identical to those of FIG. 4, and thus the description thereof will be omitted appropriately.

As shown in FIG. 1, the video player 1 functions as a video source. An analog video signal that is a baseband signal of RGB three primary colors outputted from the video player 1 is transmitted to a transmitter 5 via an analog video signal line LA1.

A host computer 3 exchanges a control signal and response signal via a system control signal line LS1. The transmitter 5 converts an analog video signal received mainly from the analog video signal line LA1 into a differential analog video signal, and outputs it to a long distance transmission line LL1 (first long distance transmission line). The video player 1 and the transmitter 5 function as a video sending source transmitting the differential analog video signal via the long distance transmission line LL1.

A display unit 30 according to the first preferred embodiment includes a display panel 16 (a predetermined display device), video display processing circuit 17, remote controller 18, remote controller receiver 19, MCU 20, receiver 31, transmitter 34, video output circuit 36, and system control signal output circuit 41.

The MCU 20 as a controller is connected to the remote controller receiver 19 via a remote controller control line LR1, connected to video display processing circuit 17 and the receiver 31 via a display control bus BD1, connected to the receiver 31 via a system control signal line LS2, connected to a transmitter 34 via a system control signal line LS3, and connected to the system control signal output circuit 41 via a system control signal line LS4. The system control signal lines LS2 to LS4 are composed of a connector cable for internal wiring.

The receiver 31 receives the differential analog video signal from a long distance transmission line LL11 and converts it into an unbalanced analog video signal to output to an analog video signal line LA2 that is internal wiring. The analog video signal line LA2 is composed of a connector cable for internal wiring. The video display processing circuit 17, transmitter 34, and video output circuit 36 are connected to the analog video signal line LA2.

The receiver 31 includes a frequency response characteristics corrector 11 and a delay corrector 12 inside thereof. The frequency response characteristics corrector 11 corrects frequency response characteristics attenuated mainly by the long distance transmission line LL1. The delay corrector 12 corrects (adjusts) differences of propagation delay. It is generally considered that the propagation delay is caused because the four-pair twisted pair cable composing the long distance transmission line LL1 has different lengths and capacities for each cable since it is industrially manufactured.

The MCU 20 is easily connected to the receiver 31 internally by the display control bus BD1. Accordingly, via the display control bus BD1, the frequency response characteristics corrector 11 performs the aforementioned correction process on the basis of a correction parameter (first correction parameter) for the frequency response characteristics from the MCU 20. Similarly, the delay corrector 12 performs the aforementioned correction process on the basis of a correction parameter (second correction parameter) for the delay from the MCU 20. Both of the correction processes by the frequency response characteristics corrector 11 and delay corrector 12 are normally performed after the conversion to the unbalanced analog video signal.

The remote controller receiver 19 receives a signal from the remote controller 18, and transmits a remote controller receiving signal to the MCU 20 via a remote controller control line LR1. The MCU 20 functions as a main control device for controlling each component (the video display processing circuit 17 and the like) of the display unit 30. The display control bus BD1 is composed of a display control signal line in I2C form and the like.

The display panel 16 is a display panel represented by a two-dimensional liquid crystal optical valve type display device including a light. The video display processing circuit 17 performs a scale conversion process represented by resizing and slew rate on the unbalanced analog video signal obtained internally via the analog video signal line LA2 from the receiver 31 so as to adapt to the number of pixels and a scanning method of the display panel 16. At this time, a setting situation rendering means (OSD) 21 inside the video display processing circuit 17 obtains the content set and rendered by the MCU 20 on the basis of the content operated by the remote controller 18 (remote controller receiving signal) via the display control bus BD1, and superimposes this rendered content on an image defined by the unbalanced analog video signal. The video display processing circuit 17 is generally referred to as a scalar.

The transmitter 34 receives the unbalanced analog video signal from the analog video signal line LA2, converts it to a balanced differential analog video signal, and transmits it to a long distance transmission line LL2 (second long distance transmission line) as a differential analog video signal (for output).

The video output circuit 36 receives the unbalanced analog video signal from the analog video signal line LA2 and outputs this unbalanced analog video signal to outside as it is as a baseband analog signal, or converts it into a digital video signal and outputs it to a video signal line LV1. That is, the video output circuit 36 outputs the unbalanced analog video signal or the unbalanced digital video signal to the video signal line LV1.

The system control signal output circuit 41 outputs the control content received from a system control signal line LS4 to outside via a system control signal line LS5.

A display unit 37 is a display unit not including a receiver for a long distance, and includes a display panel 38, video display processing circuit 39, and MCU 40 inside thereof.

The MCU 40 controls the video display processing circuit 39 and the like connected thereto via a display control bus BD2 on the basis of a control signal from the MCU 20 of the display unit 30 received via the system control signal line LS5.

The video display processing circuit 39 performs a scale conversion process on a video signal received from the video signal line LV1 to display on the display panel 38.

A receiver 26 provided externally for a display unit 27 is connected to the long distance transmission line LL2. The display unit 27 is connected to the receiver 26 and includes a display panel 28 and video display processing circuit 29 inside thereof.

With the above configuration, the display unit 30 converts the differential analog video signal transmitted from the transmitter 5 via the long distance transmission line LL1 into a baseband signal in the receiver 31 inside thereof.

As seen from the above, the aforementioned first and second correction parameters for the frequency response characteristics corrector 11 and delay corrector 12 are directly set through a display control bus BD1 by the MCU 20 by including the receiver 31 inside the display unit 30, so that the baseband unbalanced analog video signal that is subjected to the correction process is outputted to the analog video signal line LA2.

The unbalanced analog video signal along the analog video signal line LA2 is subjected to the scale conversion by the video display processing circuit 17. Thereafter, an image of the video player 1 is displayed in a scale size specified in the remote controller 18 and the host computer 3.

A control signal is inputted to the MCU 20 from the receiver 31 via the system control signal line LS2, and the control signal is appropriately distributed to the transmitter 34 and the system control signal output circuit 41 via the system control signal lines LS3 and LS4.

By outputting the differential analog video signal to the long distance transmission line LL2 outside from the transmitter 34 inside the display unit 30, the receiver 26 receives the image from the video player 1 to display the image on the display panel 28 in the display unit 27 disposed adjacent to the receiver 26.

Further, the video output circuit 36 inside the display unit 30 outputs a video signal to the video signal line LV1 outside, and the control signal of the MCU 20 is outputted form the system control output circuit 41. This makes the display unit 37 not including a receiver for a long distance transmission display the image from the video player 1 in a scale size reflecting the setting operated by the host computer 3 or the remote controller 18.

In the first preferred embodiment, the transmitter 34, video output circuit 36, and system control output circuit 41 are provided inside the display unit 30. Therefore, electric power can be saved by connecting the transmitter 34, video output circuit 36, and system control output circuit 41 to a bus corresponding to the display control bus BD1, and performing electric power control on the transmitter 34 and the respective circuits 36 and 41 under the control of the MCU 20.

In the first preferred embodiment, while each of the receiver 31, transmitter 34, video output circuit 36, and system control output circuit 41 is configured to be interconnected with each other as an independent circuit, they may be placed in one and the same circuit as an analog integrated circuit.

In the first preferred embodiment, while the system control signal lines LS2 to LS4 are configured to be interconnected as signal lines independent from the MCU 20, they may be directly bus-connected with RS-485 and the like.

In the first preferred embodiment, while the frequency response characteristics corrector 11 and delay corrector 12 in the receiver 31 are configured as hardware circuits, a program where the processes of the frequency response characteristics corrector 11 and delay corrector 12 are described may be stored in a memory, and a computer processing unit (e.g., CPU or DSP) may implement the program.

In the first preferred embodiment, the transmitter 34, video output circuit 36, and video display processing circuit 17 are configured to input the unbalanced analog video signal received from the receiver 31 via the analog video signal line LA2. Alternatively, another method is considered to provide a video switching unit (not shown) between output of the receiver 31 and the transmitter 34 and the respective circuits 36 and 17. In other words, it may configured such that the video switching unit receives a video input signal from another video input terminal (not shown) and the unbalanced analog video signal from the receiver 31, and switches them appropriately on the display control bus BD1 from the MCU 20 to output to the transmitter 34 and the respective circuits 36 and 17. The simultaneity between the switching of the aforementioned video input terminal and the switching of the system control signal via the system control signal lines LS2 to LS4 does not matter.

As described above, the display unit 30 of the first preferred embodiment constructs a connection to the MCU 20 using the display control bus BD1 inside thereof, and also constructs a connection to the video display processing circuit 17 using the analog video signal line LA2 inside thereof, by including the receiver 31. As a result, comparing to the configuration where the receiver 10 shown in FIG. 4 is disposed outside the display unit 115, volume of the entire display system including the display unit 30 can be reduced for unnecessary wiring for the external connection of the long distance transmission line LL11, analog video signal line LA11, system control signal line LS11, and the like.

Moreover, the display unit 30 according to the first preferred embodiment includes the receiver 31 receiving the differential analog video signal from the long distance transmission line LL1 and the transmitter 34 transmitting the output differential analog video signal from the long distance transmission line LL2. This allows connection to the other display unit 27 to be made only via the long distance transmission line LL2.

This also suppresses wiring materials and operation cost of the display system including the display units according to the first preferred embodiment. Further, the receiver 31 includes the frequency response characteristics corrector 11 and delay corrector 12, so that the display units according to the first preferred embodiment exercises appropriate performances.

In addition, the correction parameters (first and second) for the frequency response characteristics corrector 11 and delay corrector 12 are set under the control of the MCU 20 inside the display unit, facilitating the control of the correction of the frequency response characteristics corrector and delay corrector.

Since the display unit according to the first preferred embodiment includes the video output circuit 36, the image on the basis of the differential analog video signal transmitted from the video player 1, and the transmitter 5 to be a predetermined video sending source can be displayed even in the other display unit 38 not including a device corresponding to a receiver (26, 31, and the like), by connecting to the video signal line LV1.

In the configuration of the first preferred embodiment, the MCU 20 is able to directly control the following display unit 27 through the system control signal line LS3, transmitter 34, long distance transmission line LL2, and the receiver 26 without involving the host computer 3 in accordance with the operation of the remote controller 18.

<Second Preferred Embodiment>

Figure 2:
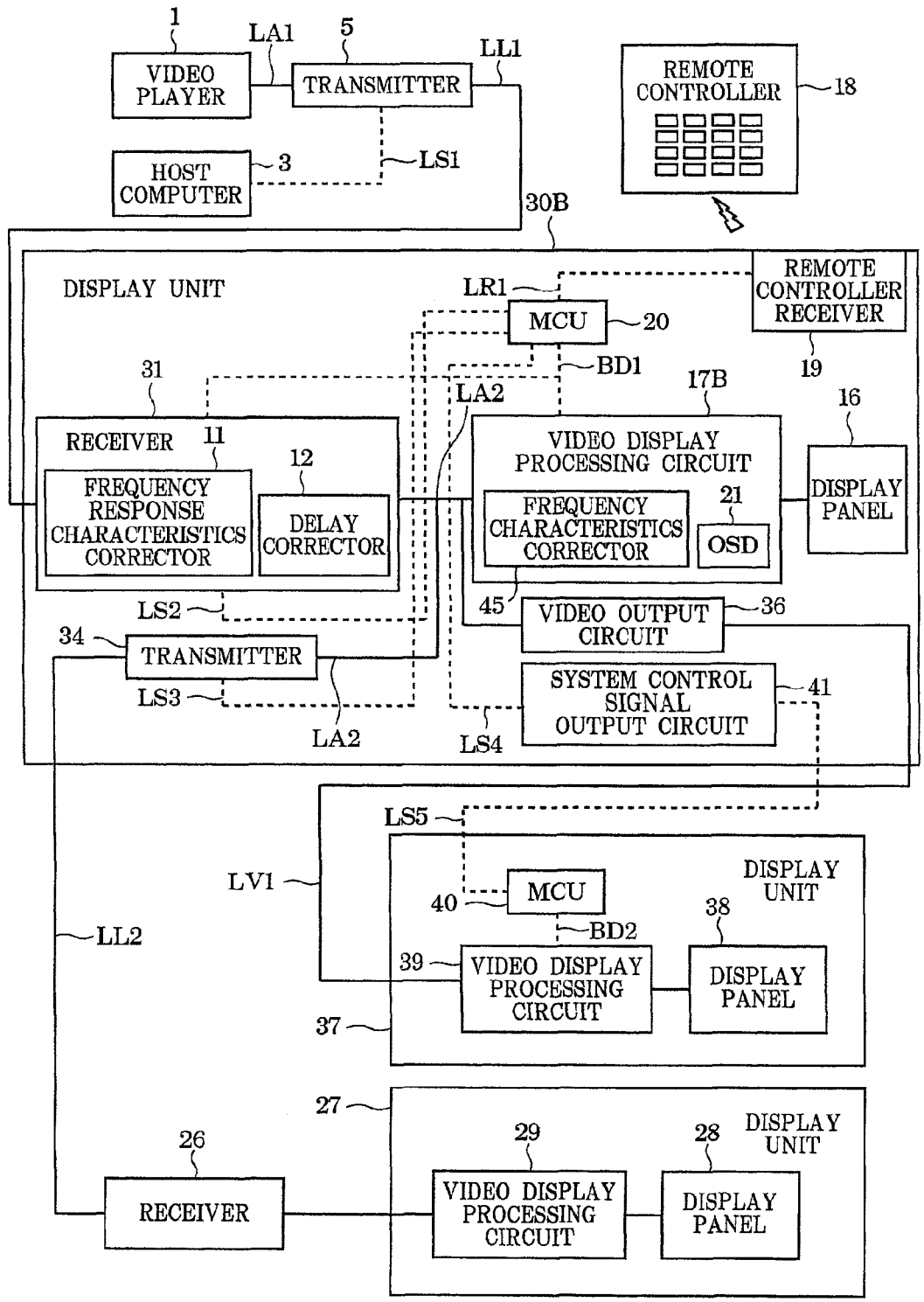
FIG. 2 is an illustrative diagram of a configuration of a display system including a display unit according to a second preferred embodiment of the present invention and using a long distance transmission line of differential analog video signals.

FIG. 2 is an illustrative diagram of a configuration of a display system including a display unit according to a second preferred embodiment of the present invention and using a long distance transmission line of differential analog video signals. The components denoted by the same reference numbers as those in FIGS. 1 and 4 are basically identical to those shown in FIGS. 1 and 4, and thus the description thereof will be omitted appropriately.

As shown in FIG. 2, a video display processing circuit 17B of a display unit 30B according to the second preferred embodiment is different from the video display processing circuit 17 of the display unit 30 according to the first preferred embodiment in that the video display processing circuit 17B includes a frequency response characteristics corrector 45 (for a video display processing circuit) as well as the OSD 21.

The frequency response characteristics corrector 45 performs a correction process of the frequency response characteristics on the basis of a correction parameter (fifth parameter) for the frequency response characteristics from the MCU 20.

In the configuration described above, when the first correction parameter of the frequency response characteristics corrector 11 in the receiver 31 is set manually, the first correction parameter of the frequency response characteristics corrector 11 is set to be weak so as to allow the image quality of the display screen to be appropriate, referring to the display panel 16. Instead, the correction parameter (fifth parameter) for the frequency response characteristics of the frequency response characteristics corrector 45 is adjusted referring to the display panel 16. The fifth correction parameter is adjusted under the control of the MCU 20 through the display control bus BD1.

As described above, since the video display processing circuit 17B in the display unit 30B according to the second preferred embodiment includes the frequency response characteristics corrector 45, frequency response correction is performed on the basis of the (fifth) correction parameter, displaying the image on the display panel 16.

<Third Preferred Embodiment>

Figure 3:
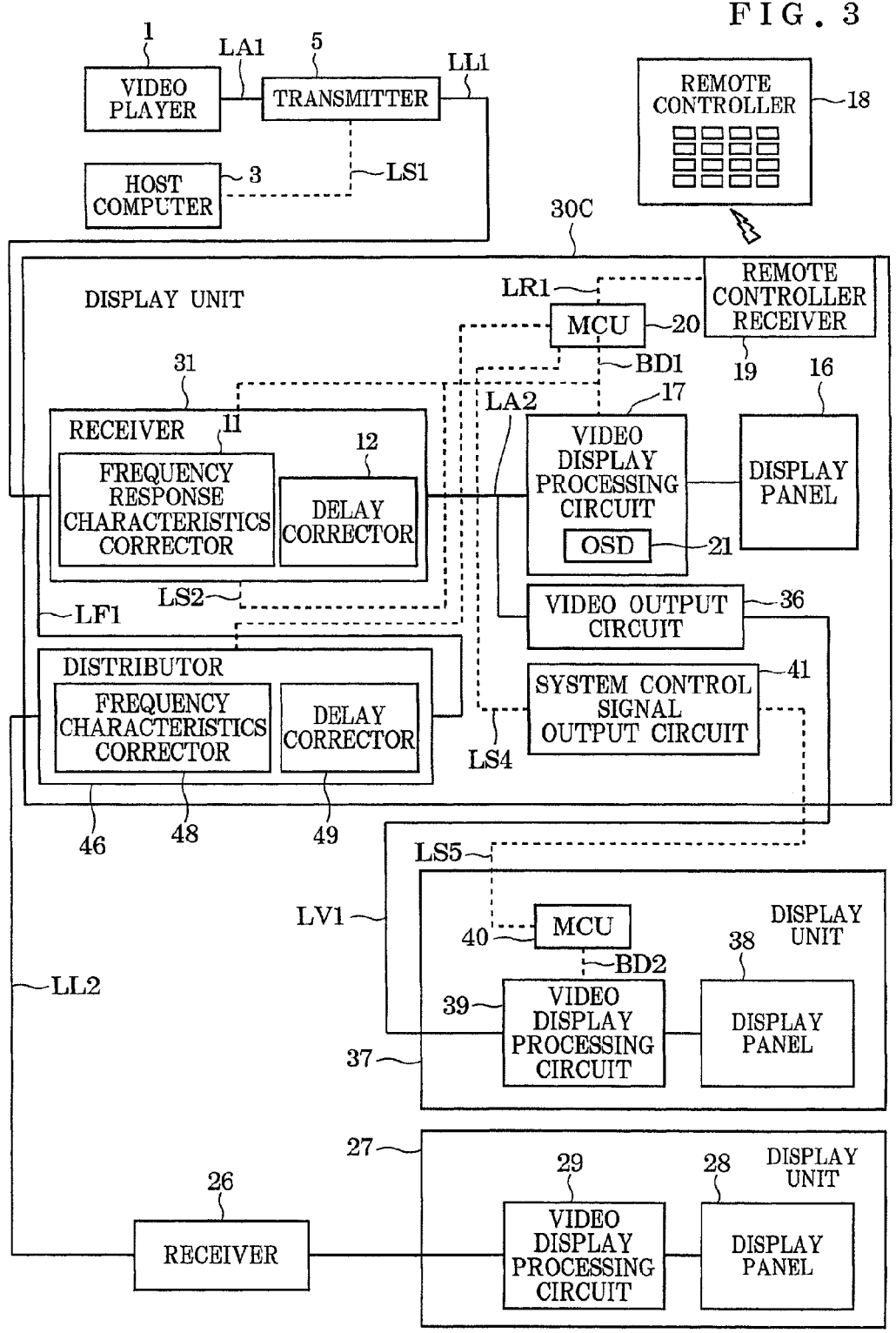
FIG. 3 is an illustrative diagram of a configuration of a display system including a display unit according to a third preferred embodiment of the present invention and using a long distance transmission line of differential analog video signals.

FIG. 3 is an illustrative diagram of a configuration of a display system including a display unit according to a third preferred embodiment of the present invention and using a long distance transmission line of differential analog video signals. The components denoted by the same reference numbers as those in FIGS. 1 and 4 are basically identical to those shown in FIGS. 1 and 4, and thus the description thereof will be omitted appropriately.

As shown in FIG. 3, a display unit 30C according to the third preferred embodiment includes a distributor 46, replacing it with the transmitter 34 inside the display unit 30 in the first preferred embodiment shown in FIG. 1. This distributor 46 inputs differential analog video signals (for output) via a long distance transmission line LL1 and a differential analog video signal line LF1 inside. The differential analog video signal line LF1 diverges and ends around the input of the distributor 46.

The distributor 46 includes a frequency response characteristics corrector (for a distributor) 48 and a delay corrector (for a distributor) 49, and is connected to the MCU 20 via the display control bus BD1. The frequency response characteristics corrector 48 corrects the frequency response characteristics attenuated mainly by the long distance transmission line LL1 and differential analog video signal line LF1. The delay corrector 49 corrects differences of propagation delay of four-pair twisted pair cable composing the long distance transmission line LL1.

The MCU 20 is easily connected to the distributor 46 internally by the display control bus BD1. Accordingly, via the display control bus BD1, the frequency response characteristics corrector 48 performs the aforementioned correction process on the basis of a correction parameter (third correction parameter) for the frequency response characteristics from the MCU 20. Similarly, the delay corrector 49 performs the aforementioned correction process on the basis of a correction parameter (fourth correction parameter) for the delay from the MCU 20.

In the configuration described above, the distributor 46 outputs the differential analog video signal received from the differential analog video signal line LF1 directly as it is. Alternatively, the distributor 46 transmits the differential analog video signal outputted after being subjected to the correction process (predetermined correction process) by the frequency response characteristics corrector 48 and the delay corrector 49 where each of the correction parameters is adjusted through the display control bus BD1 from the MCU 20, to the following receiver 26, allowing the image display by the display unit 27.

In the configuration of the third preferred embodiment, when a bus connection method represented by RS-485 is used for signal lines transmitting system control signals along the long distance transmission lines LL1 and LL2, the MCU 20 is able to directly control the following display unit 27 through the display control bus BD1, distributor 46, long distance transmission line LL2, receiver 26 without involving the host computer 3 in accordance with the operation of the remote controller 18.

The display unit 30C according to the third preferred embodiment includes the receiver 31 receiving the differential analog video signal from the long distance transmission line LL1, and the distributor 46 distributing the output differential analog video signal from the long distance transmission line LL2, allowing a connection to the other display unit 27 to be made only via the long distance transmission line LL2.

This also suppresses wiring materials and operation cost of the display system including the display unit 30C according to the third preferred embodiment. Further, the receiver 31 includes the frequency response characteristics corrector 11 and the delay corrector 12 so that the display units are able to exercise appropriate performances.

In addition, the correction parameters (first and second) for the frequency response characteristics corrector 11 and the delay corrector 12 can be set under the control of the MCU 20 inside the display unit 30C, facilitating the control of the correction of the frequency response characteristics corrector 11 and the delay corrector 12.

Similarly, the correction parameters (third and fourth) can be set under the control of the MCU 20 inside the display unit 30C, facilitating the control of the correction of the frequency response characteristics corrector 48 and the delay corrector 49.

While the invention has been shown and described in detail, the foregoing description is in all aspects illustrative and not restrictive. It is therefore understood that numerous modifications and variations can be devised without departing from the scope of the invention.

What is claimed is:

1. A display unit used for a display system transmitting differential analog video signals sent from predetermined video sending sources via a first long distance transmission line, comprising:
   a receiver for converting said differential analog video signals along said first long distance transmission line into unbalanced analog video signals, said receiver including a frequency response characteristics corrector for correcting frequency gain characteristics attenuated in said first long distance transmission line on the basis of a first correction parameter, and a delay corrector for correcting propagation delay on said first long distance transmission line on the basis of a second parameter;
   a video display processing circuit for displaying an image on a predetermined display device on the basis of said unbalanced analog video signals;
   a controller for providing said frequency response characteristics corrector and said delay corrector inside said receiver with said first and second parameters; and
   a transmitter for converting said unbalanced analog video signals into a differential form and transmitting output differential analog video signals to a second long distance transmission line to which external devices are connectable.

2. The display unit according to claim 1, further comprising,
   a video output circuit for outputting unbalanced video signals on the basis of said unbalanced analog video signals to a video signal line to which external devices are connectable, said unbalanced video signals including at least either one of said unbalanced analog video signal itself and an unbalanced digital video signal obtained by performing digital conversion on said unbalanced analog video signal.

3. The display unit according to claim 1, wherein
   said video display processing circuit includes a video display processing circuit frequency response corrector inside thereof for correcting frequency gain characteristics attenuated in said first long distance transmission line on the basis of a fifth correction parameter.

4. A display unit used for a display system transmitting differential analog video signals sent from predetermined video sending sources via a first long distance transmission line, comprising:
   a receiver for converting said differential analog video signals along said first long distance transmission line into unbalanced analog video signals, said receiver including a frequency response characteristics corrector for correcting frequency gain characteristics attenuated in said first long distance transmission line on the basis of a first correction parameter, and a delay corrector for correcting propagation delay on said first long distance transmission line on the basis of a second parameter;
   a video display processing circuit for displaying an image on a predetermined display device on the basis of said unbalanced analog video signals;
   a controller for providing said frequency response characteristics corrector and said delay corrector inside said receiver with said first and second parameters; and
   a distributor for performing a predetermined correcting process on said differential analog video signals and distributing to said second long distance transmission line as output differential analog video signals, said distributor including a distributor frequency response characteristics corrector for correcting frequency gain characteristics attenuated in said first long distance transmission line on the basis of a third correction parameter and a distributor delay corrector for correcting propagation delay on said first long distance transmission line on the basis of a fourth parameter, and said predetermined correcting process including correcting processes by said distributor frequency response characteristics corrector and said distributor delay corrector.

5. The display unit according to claim 2, further comprising,
   a video output circuit for outputting unbalanced video signals on the basis of said unbalanced analog video signals to a video signal line to which external devices are connectable, said unbalanced video signals including at least either one of said unbalanced analog video signal itself and an unbalanced digital video signal obtained by performing digital conversion on said unbalanced analog video signal.

6. The display unit according to claim 2, wherein
   said video display processing circuit includes a video display processing circuit frequency response corrector inside thereof for correcting frequency gain characteristics attenuated in said first long distance transmission line on the basis of a fifth correction parameter.

* * * * *